W. P. ALLEN, DEC'D.
M. F. ALLEN, EXECUTRIX.
DIRIGIBLE TRACTOR.
APPLICATION FILED SEPT. 1, 1915.

1,340,514.

Patented May 18, 1920.
6 SHEETS—SHEET 3.

W. P. ALLEN, DEC'D.
M. F. ALLEN, EXECUTRIX.
DIRIGIBLE TRACTOR.
APPLICATION FILED SEPT. 1, 1915.

1,340,514.

Patented May 18, 1920.
6 SHEETS—SHEET 4.

Witnesses:

Inventor:
William P. Allen.
by Burton & Burton
his Attys.

UNITED STATES PATENT OFFICE.

WILLIAM P. ALLEN, OF CHICAGO, ILLINOIS; MARY F. ALLEN EXECUTRIX OF SAID WILLIAM P. ALLEN, DECEASED.

DIRIGIBLE TRACTOR.

1,340,514.     Specification of Letters Patent.     Patented May 18, 1920.

Application filed September 1, 1915. Serial No. 48,402.

*To all whom it may concern:*

Be it known that I, WILLIAM P. ALLEN, a citizen of the United States, residing at Chicago, in the county of Cook and State of Illinois, have invented new and useful Improvements in Dirigible Tractors, of which the following is a specification, reference being had to the accompanying drawings, forming a part thereof.

This invention relates to a type of tractor which is designed primarily for heavy hauling over rough ground, or even over plowed fields, as for example, in drawing gang plows or harrows or the like, the machine not being especially intended for road use but being adaptable however for travel upon paved roads if desired. The invention consists in the various features and elements and their combinations hereinafter described and shown in the drawings as indicated by the appended claims.

Figure 1:
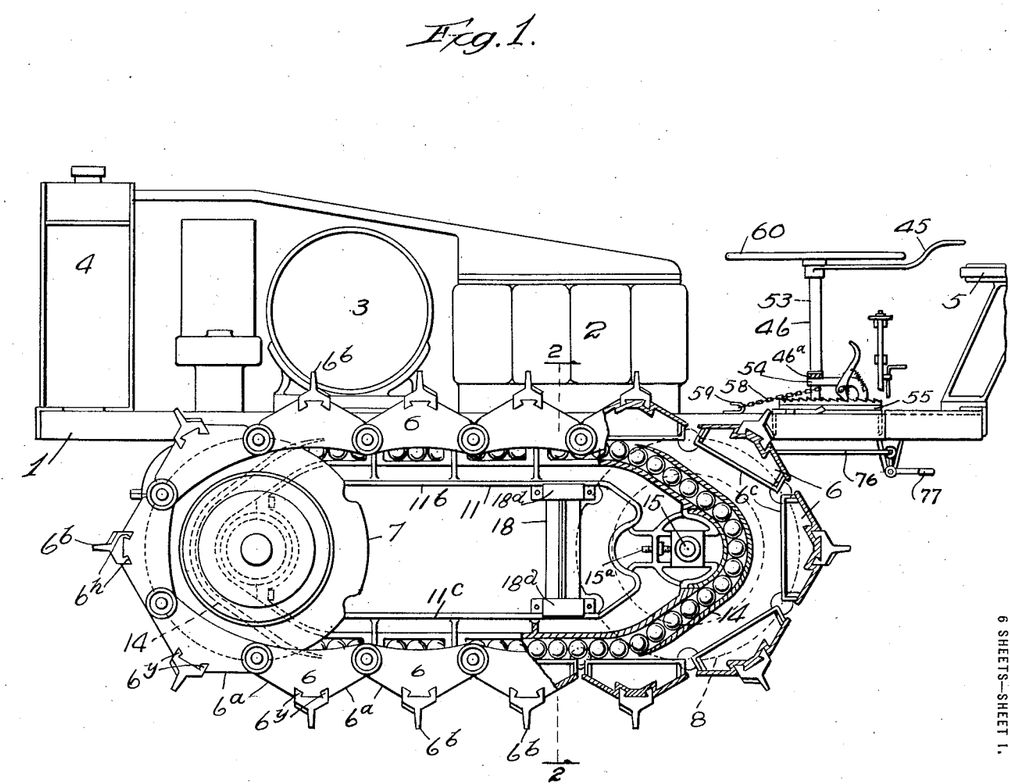
Figure 1 is a side elevation of a tractor embodying this invention with certain parts broken away and shown in section to indicate details of construction.

Referring first to Fig. 1, it will be seen that the vehicle chosen to illustrate this invention comprises a frame, 1, upon which there is mounted an internal combustion motor, 2, a fuel tank, 3, and a water cooling radiator, 4, for said motor; at the extreme rear of the frame, 1, is seen the driver's seat, 5, and positioned between said seat and the motor, 2, are the control devices which will be hereinafter more fully described. At each side of the machine there is a tractor chain composed of traction links, 6, carried upon two sprocket wheels, 7 and 8, respectively, the former being a driving or power-transmitting wheel, while the latter is merely an idler or take-up wheel; these two tractor chains serve both for the support and propulsion of the tractor, and in the model under consideration constitute its sole road-engaging means. Each of the tractor chain links, 6, is formed with two road-engaging surfaces, 6ª, disposed at an obtuse angle to each other and converging toward an apex from which there projects a blade-like traction rib, 6ᵇ; but the purpose and mode of operation of this form of traction element is quite fully discussed in my Patent No. 1,139,009, dated May 11th, 1915, and need not be further elaborated here.

Figures 2, 3, 4:
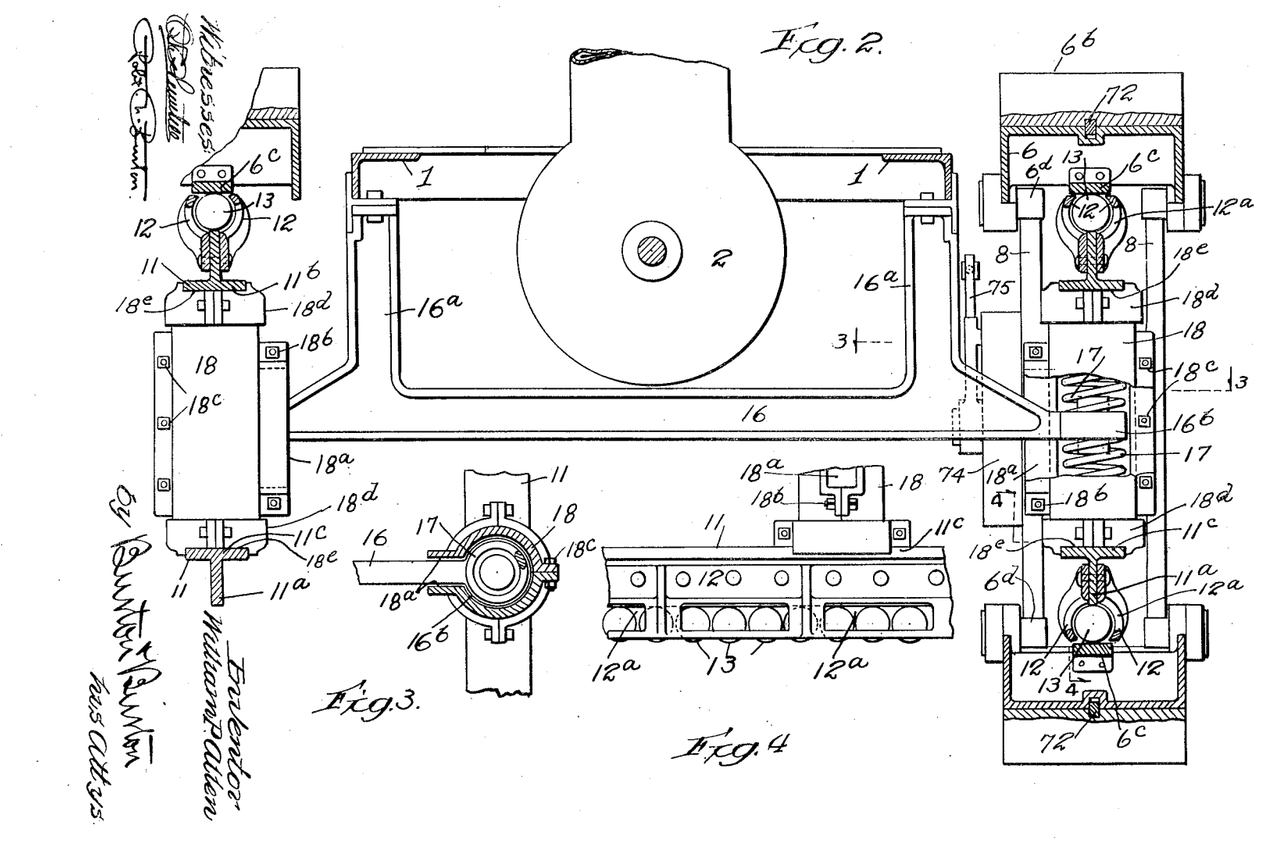
Fig. 2 is a detail section taken transversely of the vehicle as indicated at line 2—2 on Fig. 1 to illustrate the yielding connection between the tractor frame and the engine-supporting frame, together with certain other structural details.
Fig. 3 is a detail section taken as indicated at line 3—3 on Fig. 2.
Fig. 4 is a detail section taken as indicated at line 4—4 on Fig. 2.
Figure 5:
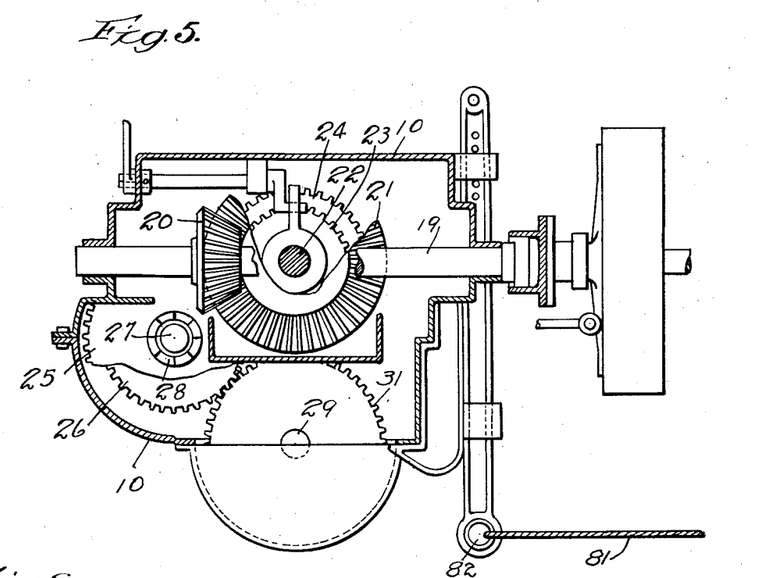
Fig. 5 is a vertical section taken in the plane of the engine crank shaft outfit and showing the principal transmission gears connected adjacent to the engine.
Figure 6:
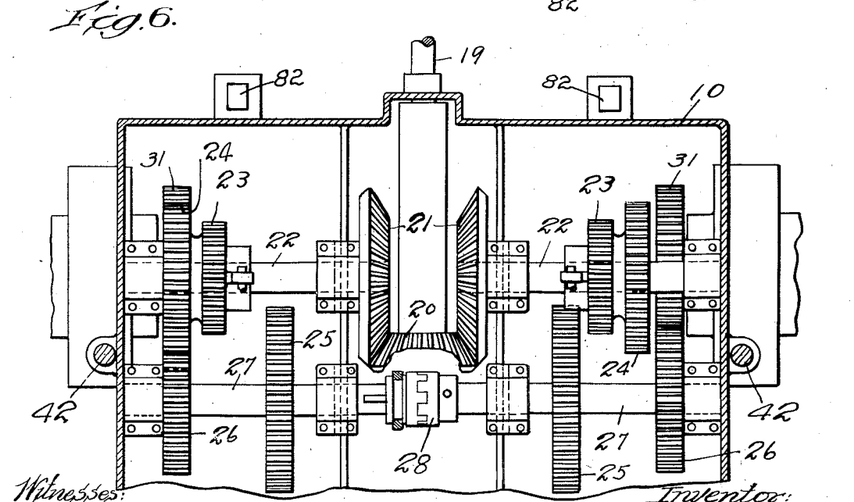
Fig. 6 is a horizontal section of the transmission casing showing in plan the transmission gear within this casing.
Figure 7:
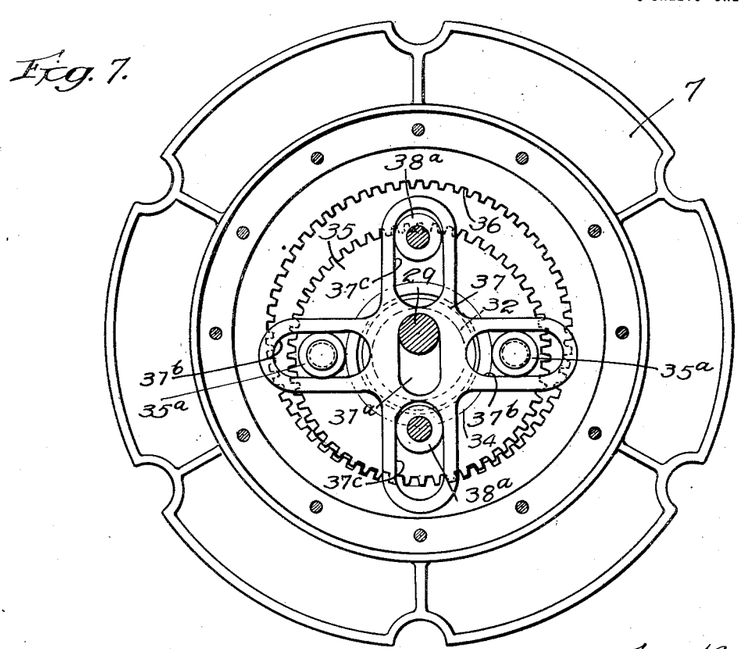
Fig. 7 is a side elevation of one of the tractor chain driving sprockets with its cover plate removed to disclose the feed within the gearing contained within the wheel.
Figures 8, 11, 12, 13, 14:
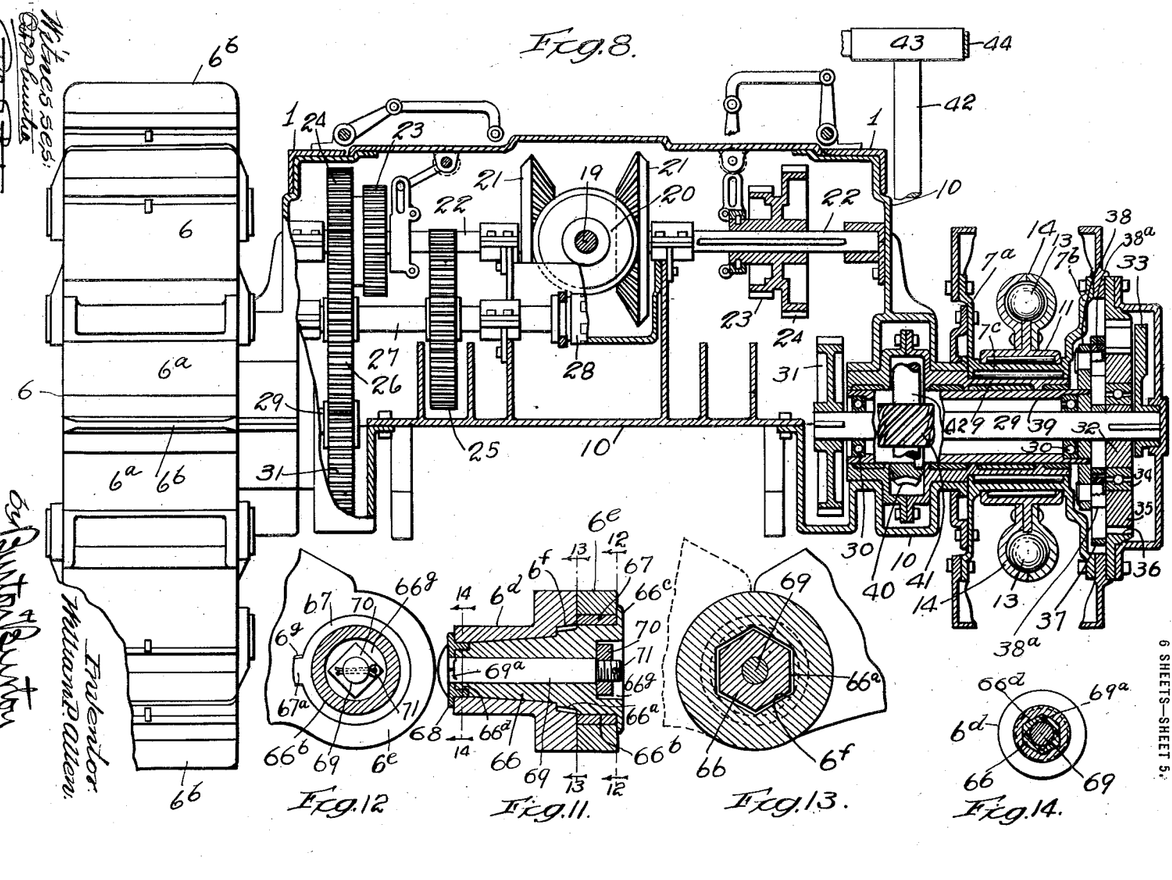
Fig. 8 is a transverse vertical section taken through the transmission casing and also through the axis of one of the tractor chain driving sprockets so as to indicate the relative arrangement of practically all the elements of the transmission gearing.
Fig. 11 is an axial section taken through one of the tractor chain link pivots to reveal details of the pivot construction.
Fig. 12 is a detail section taken as indicated at line 12—12 on Fig. 11.
Fig. 13 is a detail section taken as indicated at line 13—13 on Fig. 11.
Fig. 14 is a further detail section taken as indicated at line 14—14 on Fig. 11.

Referring to Fig. 8 it will be seen that each of the sprocket wheels, 7, comprises two web portions, 7ª and 7ᵇ, spaced apart but connected by a hub portion, 7ᶜ, mounted to rotate upon a tubular axle member, 9, extending from the transmission gear casing, 10, while said casing is rigidly mounted in the frame, 1. Pivotally carried upon the hub portion, 7ᶜ, of the wheel, 7, is the tractor frame, 11, which may be constructed as indicated in Fig. 2 from a casting of T-shaped cross section to the opposite sides of whose web, 11ᵃ, are bolted or riveted the two halves, 12, 12, of a ball race containing bearing balls, 13. The general outline of the frame, 11, consists in straight and parallel top and bottom portions, 11ᵇ and 11ᶜ, respectively, connected at their ends by slanted and curved portions, as clearly shown in Fig. 1. It will be seen that each of the tractor chain links, 6, is formed at its inner side with a bridge, 6ᶜ, which is straight from end to end of the link and serves as a bearing area for contact with the rolling bearing balls, 13. The balls, 13, roll between the bearing bridges, 6ᶜ, and the edge of the web, 11ᵃ, throughout the straight portions of said web, but since as the links pass on to the sprocket wheels their straight bearing surfaces, 6ᶜ, lie in chords of the pitch circles of said sprocket wheels, as shown in Fig. 1, it would be impossible to carry the bearing balls, 13, around either sprocket wheel in a path which would keep them tangent to its pitch circle, since they would be cramped or crushed by the links, 6, in the positions which the latter assume in passing around the wheel. The balls, 13, are therefore passed from their upper straight run to their lower straight run or vice versa, through a tubular guide, 14, which deflects them away from the pitch circle of the sprocket wheel and inwardly toward its center, and which is supported upon the slanted and curved end portions of the frame, 11, passing quite close to the axis of the sprocket wheel. As above indicated, the frame, 11, is journaled at one end upon the hub, 7ᶜ, of the driving sprocket wheel; at the opposite end it carries an axle, 15, for the idler sprocket, 8, said axle being mounted for adjustment toward and from the driving sprocket, 7, for tightening or loosening the tractor chain on the sprocket wheels. An adjusting screw for this purpose is shown at 15ᵃ.

The engine-carrying frame, 1, is connected with the tractor frame, 11, at the rear end by a cross member, 16, (see Fig. 2), passing transversely under the engine, 2, and having vertically extending posts, 16ᵃ, connected at their upper ends with the frame, 1. At each side of the machine the member, 16, terminates in a circular lug, 16ᵇ, which is carried between coiled compression springs, 17, in a cylindrical casing, 18, extending vertically between the top and bottom portions, 11ᵇ and 11ᶜ, of the tractor frame, 11. The cylinders, 18, are complete closures except for slots, 18ᵃ, through which the end portions of the member, 16, enter said cylinders and in which they are permitted a limited range of vertical play; thus the rear part of the frame, 1, which supports both the engine, 2, and the driver's seat, 5, is somewhat yieldingly connected to the tractor frame, 11, allowing said frame to play up and down with respect to the frame, 1, in passing over inequalities of road surface, and particularly permitting the frames, 11, to thus move somewhat independently of each other at the opposite sides of the machine. It may be noted that for convenience of construction and assembly the cylinders, 18, are made in halves bolted together at 18ᵇ and at 18ᶜ, their ends being closed by two-part caps, 18ᵈ, whose halves separate at a plane perpendicular to the plane of separation of the halves of the cylinder. The caps, 18ᵈ, are formed at 18ᵉ to seat upon the horizontal flanges of the frame, 11, being secured slidably in position thereon.

Thus it will be seen that considered as a vehicle the machine consists of the frame, 1, to which the two side frames, 11, are hinged to swing about the common axis of the driving sprocket wheels while the opposite ends of said frames, 11, carry the idler sprockets, 8, and are yieldingly connected with the frame, 1, through the springs, 17, and cross member, 16. The sprocket wheels, 7 and 8, being shod with the tractor chain composed of the links, 6, and said links being arranged to travel upon the bearing balls, 13, as they pass from one wheel to the other, the vehicle as such is sufficiently complete for travel. It may be observed that since the structure of the chain links, 6, leaves the bearing balls, 13, somewhat exposed to mud and dirt from the road, the curved guide members, 12, are formed with large windows or apertures, 12ᵃ, (see Fig. 4), to allow such foreign matter to work out so as to avoid clogging the balls, 13, in their race-way. It will be understood that the rolling engagement of the balls, 13, with the tractor links, 6, especially along their lower race-way, 11ᶜ, insures that the balls are kept constantly moving around their closed circuit whenever the vehicle is traveling; and are thus used progressively, securing equal wear.

For driving the tractor chain power is transmitted from the engine, 2, through a propeller shaft, 19, and a bevel pinion, 20, to a pair of bevel gears, 21, on jack shafts, 22, respectively, which are thus rotated in opposite directions. Each of the shafts, 22, carries a pair of slidable gears, 23 and 24, adapted to mesh respectively with the gears, 25 and 26, on a side shaft, 27. The shaft, 27, is made in two parts normally coupled together by means of a jaw clutch, 28. Each of the driving sprocket wheels, 7, is provided with a driving shaft, 29, carried on ball bearings, 30, and having a gear, 31, constantly in mesh with the gear, 26, of the shaft, 27.

Since the two shafts, 22, rotate constantly and in opposite directions they must not both be connected to the two parts of the shaft, 27, when the coupling, 28, is engaged, but the drive is transmitted (at a lower speed if through the gears, 23 and 25, or at a higher speed if through the gears, 24 and 26) from only one of the shafts, 22, the one selected determining the direction of travel of the vehicle whether forward or backward. If for the purpose of turning the vehicle around in a very short space it is desired to drive the two tractor chains in opposite directions, the clutch, 28, may be disengaged and both of the shafts, 22, connected to the corresponding halves of the shaft, 27, through their respective gears; but except in such rare instances the coupling, 28, will be locked in engagement.

The final drive to each of the driving sprocket wheels, 7, is effected by means of a peculiar speed-reducing gearing which is similar in principle and operation, though not identical in arrangement, with that shown in my Patent No. 1,112,586, dated Oct. 6, 1914. The gear, 31, is rigid with the shaft, 29, at whose opposite end there is rigidly carried an eccentric, 32, counter-balanced by a weight, 33, and carrying on ball bearings, 34, a gear, 35, arranged to mesh with an internal gear, 36, concentrically carried by, and rigidly secured to, the web, 7$^c$, of the sprocket wheel, 7. Now as the shaft, 29, and its eccentric, 32, revolves within the gear, 35, the latter will be caused to travel rotatively around the internal or annular gear, 36, meshing with its teeth successively so long as the wheel, 7, is stationary and the gear, 35, is left free to revolve. If, however, the gear, 35, is held against rotation while the wheel, 7, is free to turn, the eccentric movement of the gear, 35, will cause a differential rotative travel of the gear, 36, and its associated wheel, 7, whose angular movement for each revolution of the shaft, 29, will be measured by the difference in number of teeth of the gears, 35 and 36. For holding the gear, 35, against rotation there is provided a trammel plate, 37, slotted at 37$^a$, to accommodate the shaft, 29. A pair of rollers, 35$^a$, carried on the face of the gear, 35, engage slots, 37$^b$, in the plate, 37, while similar rollers, 38$^a$, extend from the face of a plate, 38, to engage transversely arranged slots, 37$^c$, in the plate, 37. The plate, 38, is rigidly secured to the end of a rotatably mounted sleeve, 39, concentric with the shaft, 29, and inclosing the latter throughout most of its length. The sleeve, 39, carries a spiral gear, 40, accommodated in an enlargement of the tubular tub-axle, 9, on which the sprocket wheel, 7, is mounted. As shown in Fig. 8, a spiral pinion, 41, on a shaft, 42, meshes with the spiral gear, 40, for transmitting any motion of said gear to a brake drum, 43, carried on the upper end of the shaft, 42.

Now if by means of the brake band, 44, the shaft, 42, is held stationary it will block the gear, 40, and the tubular member, 39, against rotation, though allowing reciprocation of the trammel plate, 37, in the direction of its slots, 37$^c$. The trammel plate, 37, in turn will prevent rotation of the gear, 35, while permitting the latter to reciprocate with respect to the plate, 37, in the direction of the slots, 37$^b$, the resulting movement of the gear, 35, being a non-rotative but eccentric travel operates to cause the previously mentioned differential rotation of the gear, 36, and the driving sprocket wheel, 7. This arrangement permits the maximum speed of the wheel, 7, for a given speed of its driving shaft, 29, but it will be seen that by permitting a little slippage of the brake band, 44, upon the drum, 43, the trammel plate, 37, will be allowed to revolve very slowly thus permitting a corresponding slight rotation of the gear, 35, and thus decreasing its driving effect on the gear, 36. By permitting more and more of such slippage the speed of the wheel, 7, may be reduced until when the brake band, 44, is completely released, any load upon the wheel, 7, will cause it to stand at rest while the engine expends itself merely in revolving the small shaft, 42, and rolling the gear, 35, idly around on the teeth of the gear, 36. This is the manner in which the speed of the vehicle is actually controlled, viz., by varying the frictional hold of the brake band, 44, upon the shaft, 42.

While the speed-reduction gear has been described as for one sprocket wheel only, it will be understood that the construction is completely duplicated at the other side of the machine, so that both the traction chains may be driven at variable speeds determined by the amount of friction on the controlling brake band drums, 43. And since the vehicle is provided with no wheels other than the tractor sprocket wheels, this variability of the speed of travel of the tractor drum or chains independently of one another, may be taken advantage of for steering it. For this purpose there is mounted convenient to the driver's seat, 5, a tiller lever, 45, whose hollow rock shaft or column, 46, carries a pair of oppositely extending arms, 46$^a$, connected by links, 47, to levers, 48. The levers, 48, are coupled by rods, 49, to the opposite ends of a beam, 50, from which links, 51, extend to the control levers, 52, on the brake bands, 44. The column, 46, is mounted on a winding shaft, 53, being freely journaled thereon, while the winding shaft, 53, is journaled in a sliding frame, 54, mounted for sliding adjustment in guide-ways, 55, secured to transverse members, 1ˣ, of the frame, 1. One of the guides, 55, is formed with ratchet teeth, 55ᵃ, adapted to engage a locking pawl, 56, pivoted on the frame, 54, and formed with a foot-piece, 56ᵃ, by which it may be rocked upon its pivot for release from the ratchet teeth, 55ᵃ. A spring, 57, serves to automatically effect engagement of the pawl, 56, with the teeth, 55ᵃ, except when the pawl is thus purposely swung clear of the teeth by pressure on the foot-piece, 56ᵃ. A chain, 58, is connected at one end to a hook, 59, on one of the thrust members, 1ˣ, of the frame, 1, and its other end is attached to the winding shaft 53. A hand-wheel, 60, on the shaft, 53, provides means by which the operator may rotate the shaft, 53, thus winding or unwinding the chain 58, thereon, and thus causing the frame, 54, to move bodily toward or from the hook, 59, in its guide-ways, 55. If during such movement of the frame, 54, the tiller, 45, is left free to assume its natural position, it will be seen that the cross-bar of the column, 46, which comprises the oppositely-extending arms, 46ᵃ, will serve merely as an equalizer bar for transmitting the movement of the frame, 54, to the two similar levers, 48, and thence through the linkage above described to the two brake levers, 52. As the hand-wheel, 60, is turned to wind more and more of the chain, 58, onto the winding shaft, 53, thus drawing the frame, 54, nearer to the hook, 59, the two brake bands, 44, will thus be tightened by equal amount so that the two tractor chains will tend to travel at equal speeds, causing the vehicle to move in a straight line. If now the tiller lever, 45, which is rotatably mounted on the winding shaft, 53, be swung to the right or to the left, it is evident that the arms 46ᵃ, will move through corresponding angles, but oppositely with respect to the two levers, 48, to which they are respectively connected; that the previously equal adjustment of the two brake bands, 44, will be rendered unequal, permitting one of the tractor chains to travel faster than the other, and thus causing the vehicle to advance in a curved path. This comprises the intended mode of steering the tractor, and it has proved to be a very sensitive means for controlling the movements of the vehicle. The average rate of travel is governed by the average tightness of the two brake bands, 44, as controlled by the hand-wheel, 60, while the direction of travel is governed by the lever, 45, which operates, so far as the driver is concerned, simply as an ordinary tiller lever, such as is frequently employed on an ordinary four-wheeled motor vehicle for controlling the movements of the steering wheels. It may be understood that the chain, 58, may be unwound by turning the hand wheel, 60, to allow the frame, 54, to slide back far enough so that the brake bands, 44, will both be entirely released, thus permitting free rotation of the brake drums on the shafts, 42, and permitting the vehicle to stand at rest with the engine still running. Thus it may be noted that all changes of speed and changes of direction caused by varying the relative speeds of the two tractor chains are effective without at any time disconnecting the engine from the tractor chain.

Details of construction of the tractor chain links are shown in Figs. 11 to 16, inclusive. Each of the links is a hollow cast form having at one end the interior bosses, 6ᵈ, in which are formed tapered sockets, and having at the opposite end the apertured lugs, 6ᵉ, extending laterally beyond the planes of the side walls of the links for lapping over such walls in registration with bosses, 6ᵈ, of the next link in the chain. At each angle connection there is inserted in the apertured lug, 6ᵉ, and tapered socket of the boss, 6ᵈ, a tapered pivot member, 66, having a hexagonal portion, 66ᵃ, engaging a hexagonal recess, 6ᶠ, in the base of the links to hold the pivot against rotation. The aperture in the part, 6ᵉ, is considerably larger than the circular bearing surface, 66ᵇ, of the pivot to accommodate a bushing, 67, rendered non-circular by a lug, 67ᵃ, which engages a correspondingly formed notch, 6ᵍ, to hold the bushing against rotation. The bushing, 67, is retained in place by a head or flange, 66ᶜ, on the pivot member, 66, and said member itself is held in place by a flanged cap, 68, having a squared recess engaging the squared terminal, 66ᵈ, of the pivot. The cap, 68, has a square aperture to accommodate the square shank, 69ᵃ, of a carriage bolt, 69, extending axially through the pivot member, 66, and secured by a nut, 70, accommodated in a recess, 66ᵍ. Finally the nut is locked in position by a cotter pin, 71, if desired. In this construction there are only two finished surfaces, namely, the bearing surface, 66ᵇ, and the corresponding bearing surface of the bushing, 67; the remaining parts of the pivot construction may be simply cast without additional machine work, thus making the fittings quite inexpensive. It is expected that the principal wear will come on the bushing, 67, which it is evident may be easily and cheaply replaced when necessary.

Figures 9, 10, 17:
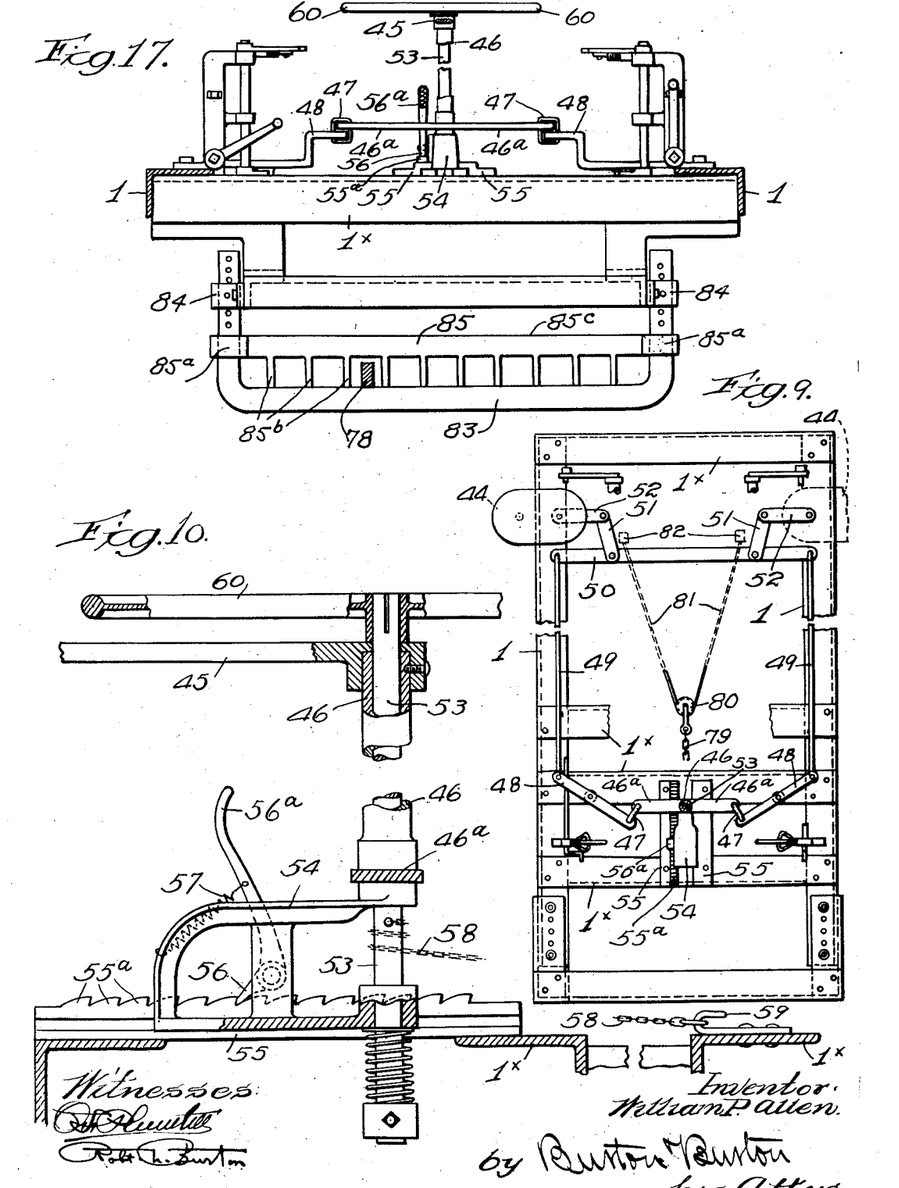
Fig. 9 is a top plan view of the engine-supporting frame with the engine omitted, but showing the arrangement of the control devices.
Fig. 10 is a side elevation showing the control devices illustrated in Fig. 9.
Fig. 17 is a transverse section showing the control devices in rear elevation and also certain parts of the drawbar construction.
Figures 15, 16:
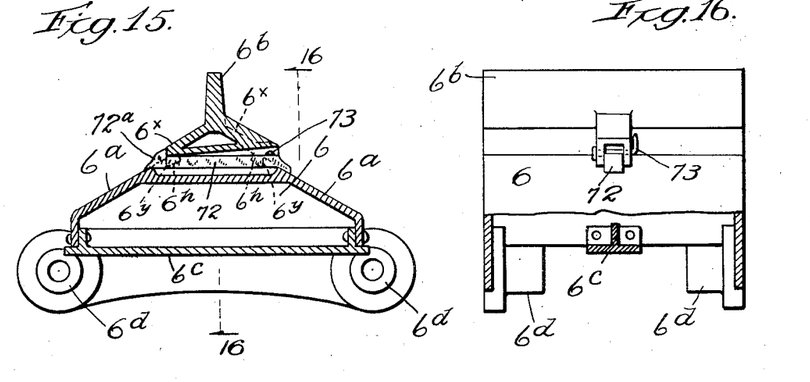
Fig. 15 is a longitudinal vertical section taken transversely of the link pivot to indicate the important structural features of the tractor link.
Fig. 16 is a sectional view taken as indicated at line 16—16 on Fig. 15.

If it becomes necessary for the tractor to travel any considerable distance on a paved road, the traction blades, 6ᵇ, may be removed to give the traction chain a more nearly flat bearing surface which is less likely to injure the road, and which gives the vehicle a better footing on the hard surface of the road than it can get with the mere edges of the blades, 6ᵇ. The traction blades are therefore made removable by the construction indicated in Fig. 15. Each blade, 6ᵇ, is provided with a foot flange, 6ˣ, which slopes away from both sides of the blade in planes substantially parallel to the bearing faces, 6ᵃ, of the links. The apex portion of the links, 6, is formed with a pair of transverse grooves, 6ʰ, and the flange, 6ˣ, has correspondingly shaped ribs, 6ʸ, for engaging the grooves. Two of the walls of the respective grooves, 6ʰ, are not parallel but lie in planes converging away from the direction in which the blades, 6ᵇ, project, that is, toward the inner part of the links, 6. The space between the ribs, 6ʸ, thus becomes itself an undercut groove wider at its bottom than at its mouth, so that when the blade, 6ᵇ, is engaged in the link, 6, it can only be removed by sliding transversely of the plane of the tractor chain and is in no danger of falling off as the link travels around the sprocket wheels. The blade is blocked against lateral shifting on the link however by means of a key, 72, driven lengthwise of the link at about the middle of its width, and engaging notches in the proximate parts of the link casting and the foot of the blade. When the key, 72, is positioned with its head, 72ᵃ, stopped against the foot flange, 6ˣ, a nail, 73, may be driven under the opposite end of the key, 72, and bent as indicated in Fig. 17, to lock it in place. As the blade, 6ᵇ, will not be frequently removed, this method of securement is found quite satisfactory, and when it is necessary to remove the blade the nails, 73, can be quickly cut and pulled out of place to permit the other parts to be disengaged.

As above noted, the direction of the vehicle is controlled by varying the relative speeds of the two tractor chains, but under some circumstances, particularly when running under a light load, there will be a tendency for the vehicle to travel a straight path even though one of the brake bands, 44, is set tighter than the other to cause an equal distribution of power between the two traction chains. In such a case the drive is entirely accomplished by one of the chains while the other is fed around at equal speed by its engagement with the road surface. Since this would interfere with the desired steering action each of the tractor chains is provided with a brake device comprising a drum, 74, carried as shown in Fig. 2 on the idler sprocket wheel, 8, with which there may be associated any desired form of brake band or shoe operable through the lever, 75, connected by a link, 76, with a foot pedal, 77, conveniently near the driver's seat, 5; thus when the load is insufficient to retard either of the tractor chains desired for steering purposes, such retardation may be effected by applying the brake on the idler sprocket of that chain.

For coupling the tractor to any load which it is to pull, there is shown a draw bar, 78, connected through a chain 79 and pulley, 80, to a flexible cable, 81, both ends of which are anchored as at 82, to a part of the tractor frame near the forward end. The draw bar, 78, is supported in a horizontal guide way, 83, carried on the tractor frame in mountings, 84, in which it is vertically adjustable. The upper member, 85, of the guide way, is formed with end portions, 85ᵃ, slidably engaging the vertical end portions of the member, 83, and removable therefrom when the latter is dismounted from its supports, 84. One side of the member, 85, is dentate in formation having a series of stops, 85ᵇ, between any two of which the draw bar, 78, may be positioned to determine such lateral position of the coupling as may be required by the load. If it is desired to allow free lateral play of the draw bar, 78, in the horizontal guide way the member, 85, may be reversed to bring its straight edge, 85ᶜ, instead of its dentate side proximate to the bar, 78. Any suitable means for securing the member, 83, in its mountings, 84, may be employed; the drawing shows a series of holes in each of the end portions of the guide, 83, adapted to register with a corresponding hole in each of the parts, 84, to receive a holding pin or bolt.

I claim:—

1. In a tractor comprising two traction units mounted to move in parallel paths, a motor, separate speed-varying transmission trains from said motor to said traction units, respectively, and each adjustable to transmit continuous rotary motion from the motor to its respective traction unit at any desired speed from zero to a maximum, and speed-controlling means for each of said trains arranged conveniently for simultaneous adjustment by a single operator.

2. In a tractor comprising two traction units mounted to move in parallel paths, a motor, transmission trains from said motor to said traction units, respectively, and a speed-controlling member associated with said transmission trains and mounted to have two movements for adjusting said transmissions, said movements being adapted, respectively, to vary the speed of both traction units either equally or differentially at the election of the operator.

3. In a tractor comprising two traction units mounted to move in parallel paths, a motor, transmission trains including speed-varying mechanism connected between said motor and said traction units, respectively, and a control member connected to both speed-varying mechanisms and mounted for both rotative movement and bodily movement of its portion which is so connected, one of said movements being arranged to adjust the speed-varying mechanisms differentially, while the other movement is adapted to effect like changes in both mechanisms.

4. In a tractor comprising two traction units mounted to move in parallel paths, a motor, transmission trains including speed-varying mechanism connected between said motor and said traction units, respectively, and a control member connected to both speed-varying mechanisms and mounted for rotative adjustment and also for bodily movement of its portion which is so connected, said connections being arranged to cause simultaneous adjustment of both speed-varying mechanisms either in like or in opposite sense according as the control member is given bodily or rotative movement, respectively.

5. In a tractor comprising two traction units mounted to move in parallel paths, a motor, transmission gearing therefrom to each of said units including separate speed-varying mechanism for each unit adjustable to produce any desired speed of the traction unit from zero to a maximum, separately operable brakes adapted for retarding either traction unit at will, and controlling means both for said speed-varying mechanism and for said brakes disposed at one part of the tractor for simultaneous use by a single operator.

6. In a tractor comprising two traction units mounted to move in parallel paths, a motor, transmission gearing therefrom to each of said units including separate speed-varying mechanism for each unit adjustable to transmit continuous rotary motion from the motor to the traction unit at any desired speed from zero to a maximum, separately operable brakes adapted for retarding either traction unit at will, and controlling means both for said speed-varying mechanism and for said brakes disposed at one part of the tractor for simultaneous use by a single operator.

7. In a tractor comprising two traction units mounted to move in parallel paths; a motor, separate transmission trains to said traction units respectively, each including a part whose retardment tends to increase and whose acceleration tends to reduce the motion transmitted from the motor to the traction unit; separate speed-controlling means for such parts of both trains, and operating connections therefor conveniently located for simultaneous adjustment by a single operator whereby the actual and relative speeds of the traction units may be varied gradually and at will without temporary disconnection from the motor.

8. In a tractor comprising two traction units mounted to move in parallel paths; a motor; separate transmission trains from said motor to said traction units respectively, each including a part constantly connected for rotation by the train and whose resistance to such rotation determines the proportion of power transmitted through said train, and controlling means for each train adapted for gradually varying such resistance at will, said controlling means being conveniently arranged for simultaneous adjustment by a single operator, whereby the ratio of power distribution between the two traction units may be varied gradually and at will without temporary disconnection from the motor.

9. In a tractor comprising two traction elements mounted to move in parallel paths, a motor, transmission gearing therefrom to each of said elements including separate speed-varying mechanism for each element; speed-controlling levers for said mechanisms respectively, and a single adjusting member connected to both of said levers for causing simultaneous and similar adjustment of the two speed-varying mechanisms.

10. In a tractor comprising two tractor chains mounted to move in parallel paths, a motor, transmission gearing therefrom to each of said chains including separate speed-varying mechanism for each chain; and controlling means adapted to adjust one of said mechanisms for increasing the speed of one chain while simultaneously adjusting the other for decreasing the speed of its chain.

11. In a tractor comprising two traction elements mounted to move in parallel paths, a motor, transmission gearing therefrom to each of said elements including separate speed-varying mechanism for each element, adjustable to produce any desired speed of the traction element from zero to a maximum, and controlling means adapted to adjust one of said mechanisms for increasing the speed of one element while simultaneously adjusting the other for decreasing the speed of its connected traction element.

12. In a tractor comprising two traction elements mounted to move in parallel paths, a motor, transmission gearing therefrom to each of said elements including separate speed-varying mechanism for each element, adjustable to produce any desired speed of the traction element from zero to a maximum without temporary disconnection from the motor or from the tractor, and controlling means adapted to adjust one of said mechanisms for increasing the speed of one element while simultaneously adjusting the other for decreasing the speed of its connected traction elements.

13. In a tractor comprising two traction elements mounted to move in parallel paths, a motor, transmission gearing therefrom to each of said elements including separate speed-varying mechanism for each element, adjustable to produce any desired speed of such element from zero to a maximum; a pivotally mounted bar; speed-controlling means for the said mechanisms respectively arranged symmetrically with relation to said bar; linkage connecting the two levers with the bar at opposite sides of its pivot, and means for swinging said bar upon its pivot to vary the relative speeds of the two traction elements for steering the tractor.

14. In a tractor comprising two traction elements mounted to move in parallel paths, a motor, transmission gearing therefrom to each of said elements including separate speed-varying mechanism for each element, adjustable to produce any desired speed of such traction elements from zero to a maximum; a pivotally-mounted bar; speed-controlling means for the said mechanisms respectively arranged symmetrically with relation to said bar; linkage connecting the two levers with the bar at opposite sides of its pivot, and a tiller handle rigidly connected with said bar for steering the tractor by varying the relative speeds of the two traction elements.

15. In a tractor comprising two traction elements mounted to move in parallel paths, a motor, transmission gearing therefrom to each of said elements, including separate speed-varying mechanism for each element, composed of a power shaft and a tractor-driving wheel concentric therewith; a gear train whose members are mounted on the shaft for transmitting rotation between the shaft and the wheel, said train comprising a part whose retardment tends to increase, and whose acceleration tends to reduce the motion transmitted between the shaft and the wheel, and a friction brake adjustable for varying the speed of such part, together with linkage for simultaneously adjusting the two friction brakes oppositely for steering the tractor.

16. In a tractor comprising two traction elements mounted to move in parallel paths, a motor, transmission gearing therefrom to each of said elements, including separate speed-varying mechanism for each element, composed of a power shaft and a tractor-driving wheel concentric therewith; a gear train whose members are mounted on the shaft for transmitting rotation between the shaft and the wheel, said train comprising a part whose retardment tends to increase, and whose acceleration tends to reduce the motion transmitted between the shaft and the wheel, a member geared up from said retardable part to rotate at several times the angular velocity of such part and a friction brake adjustable for varying the speed of such member, together with linkage for simultaneously adjusting the two friction brakes oppositely for steering the tractor.

17. In a tractor comprising two traction elements mounted to move in parallel paths, a motor, transmission gearing therefrom to each of said elements, including separate speed-varying mechanism for each element, composed of a power shaft and a tractor-driving wheel concentric therewith; a gear train for transmitting rotation between said shaft and the wheel comprising a part whose retardment tends to increase and whose acceleration tends to reduce the motion transmitted, a second shaft and a brake drum thereon, a pair of spiral gears connecting said second shaft and said retardable part whereby the shaft is adapted to be driven by said part at several times the angular velocity thereof, and a friction brake positioned to operate upon the drum, together with linkage for simultaneously adjusting the two friction brakes of the respective speed-varying mechanisms, said linkage being adapted to adjust said brakes oppositely for steering the tractor.

18. In a tractor comprising two traction elements mounted to move in parallel paths, a motor, transmission gearing therefrom to each of said elements, including separate speed-varying mechanism for each element, composed of a power shaft and a tractor-driving wheel concentric therewith; a gear train for transmitting rotation between said shaft and the wheel and comprising a part whose retardment tends to increase and whose acceleration tends to reduce the motion transmitted, a member geared up from said retardable part to be driven thereby at several times the angular velocity thereof and a friction brake adjustable for varying the speed of such member, together with a pivotally mounted bar, symmetrical linkage connecting the respective friction brakes of the two speed-varying mechanisms with said bar at opposite sides of its pivot and a tiller handle rigidly connected with said bar for steering the tractor by simultaneously adjusting the two friction brakes oppositely to vary the relative speeds of the two traction elements.

19. In a tractor comprising two traction elements mounted to move in parallel paths, a motor, transmission gearing therefrom to each of said elements, including separate speed-varying mechanism for each element, speed-controlling levers for said mechanism respectively, arranged symmetrically about an axis, a member mounted for adjustment along said axis and linkage for said levers connecting them with said member to secure a simultaneous and similar adjustment of the two speed-varying mechanisms, such member being also movable upon its mountings for causing unequal adjustment of the two speed-varying mechanisms so as to vary the relative speeds of the two traction elements for steering the tractor.

20. In a tractor comprising two traction elements mounted to move in parallel paths, a motor, transmission gearing therefrom to each of said elements, including separate speed-varying mechanism for each element, composed of a power shaft and a tractor-driving wheel concentric therewith; a gear train for transmitting rotation between the shaft and the wheel and comprising a part whose retardment tends to increase and whose acceleration tends to reduce the motion transmitted between the shaft and the wheel, a member geared up from said retardable part to rotate at several times its angular velocity and a friction brake adjustable for varying the speed of such member, together with speed-controlling levers for the two brakes respectively arranged symmetrically about an axis, a member mounted for adjustment along said axis, and symmetrical linkage for said levers connecting them with said member to secure a simultaneous and similar adjustment of the two brakes, said member being also adjustable in its mounting to cause unequal adjustment of the two brakes for varying the relative speeds of the two traction elements in steering the tractor.

21. In a tractor comprising two traction elements mounted to move in parallel paths, a motor, transmission gearing therefrom to each of said elements including separate speed-varying mechanism for each element, composed of a rotating shaft an eccentric thereon, a spur gear journaled on the eccentric, an internal gear having a greater number of teeth than the spur gear meshing with the latter and journaled concentrically with the shaft, a trammel device controlling the rotation of the spur gear about its own axis and a friction brake for varying the speed at which the trammel device is permitted to rotate about the shaft, together with linkage for simultaneously adjusting the two friction brakes oppositely, for steering the tractor by varying the relative speeds of the two traction elements.

22. In a tractor comprising two traction elements mounted to move in parallel paths, a motor, transmission gearing therefrom to each of said elements including separate speed-varying mechanism for each element adjustable to produce any desired speed of the traction element from zero to a maximum without temporary disconnection from the motor or from the tractor; speed-controlling levers for said mechanisms respectively arranged symmetrically about an axis; a guide-way parallel to said axis, a member mounted for movement in said guide-way along said axis; a shaft journaled for rotation in said member; a chain having one end fixed and the other end secured to said shaft and adapted to be wound thereon by rotative adjustment of the shaft, and symmetrical linkage for the speed-controlling levers connecting them respectively with said adjustable member.

23. In a tractor comprising two traction elements mounted to move in parallel paths, a motor transmission gearing therefrom to each of said elements, including separate speed-varying mechanism for each element adjustable to produce any desired speed of the traction element from zero to a maximum without temporary disconnection from the motor or from the tractor; speed-controlling levers for said mechanisms respectively arranged symmetrically about an axis; a member mounted for adjustment along said axis; ratchet teeth disposed in a line parallel to the axis; a pawl on the member adapted to engage said teeth; a shaft journaled for rotation in said member; a chain having one end fixed and the other end secured to said shaft and adapted to be wound thereon by rotation of the shaft; a hand wheel on the shaft for rotating it, and symmetrical linkage from the said adjustable member to said speed-controlling levers respectively.

24. In a tractor comprising two traction elements mounted to move in parallel paths; a motor, transmission gearing therefrom to each of said elements, including separate speed-varying mechanism for each element, adjustable to produce any desired speed of the traction element from zero to a maximum without temporary disconnection from the moor or from the tractor; speed-controlling levers for said mechanisms respectively arranged symmetrically about an axis, a member mounted for adjustment along said axis; a winding shaft journaled in said member; a chain having one end connected with said shaft and the other end fixed at a point substantially in the aforesaid axis, whereby rotation of the winding shaft will wind the chain thereon and advance the member along the axis, an equalizer bar pivoted on said winding shaft, and symmetrical linkage connecting said speed-controlling levers with said equalizer bar at opposite sides of its pivotal mounting respectively, together with a hand wheel on the winding shaft for rotating it, and a tiller lever rigid with said equalizer bar for swinging it to an unsymmetrical position with respect to the two speed-controlling levers to vary the relative speed of the two traction elements for steering the tractor.

25. In a tractor comprising two tractor chains mounted to move in parallel paths, a motor transmission gearing comprising two rotary members connected to said motor for simultaneous rotation in opposite directions, a counter shaft in two parts operatively connected to the respective tractor chains; a coupling for such parts disengageable at will, and separate means for connecting said parts respectively with the said rotary members.

26. In a tractor comprising an endless tractor chain, a driving sprocket wheel on which it is carried at one end, and an idler wheel supporting said chain at the other end; a motor and transmission gearing therefrom to the tractor chain, comprising a driven gear on the driving sprocket, a shaft and a driving gear thereon meshing with the gear on said sprocket; a frame in which said shaft and the chain-carrying wheels are mounted, the said gears being arranged in said frame so that the blocking of the driven gear would tend to cause travel of the driving gear around it in direction to increase the bearing force of the idler wheels against the road.

27. In a tractor comprising an endless tractor chain, a driving sprocket wheel on which it is carried at one end, and an idler wheel supporting said chain at the other end; a motor and transmission gearing therefrom to the tractor chain, comprising a shaft having its axis substantially parallel to that of the driving sprocket, and intermeshing spur gears on said shaft and sprocket respectively, together with a frame in which said shaft and said tractor chain-carrying wheels are mounted and in which the driving sprocket is arranged as the forward wheel and the idler as the rear wheel when the tractor is operated for pulling a load.

28. In a tractor comprising an endless traction chain composed of rigid links pivotally joined and carrying wheels for said chain, one face of each link being formed for road engagement and the opposite face having a straight bearing surface; a plurality of rolling members and a run-way therefor, said members extending from wheel to wheel to present said rolling members to said bearing surfaces of the chain links for supporting them in their travel, and said run-way constituting a closed circuit substantially filled with said rolling members, and formed to shunt said members out of contact with the chain links at those portions of their travel in which they traverse the said carrying wheels.

29. In a tractor comprising a flexible traction member and wheels on which it is carried, one face of the traction member being formed for road engagement and the opposite face having a straight bearing surface; a plurality of rolling members and a run-way for said members extending from wheel to wheel, and formed with a longitudinal opening opposite the path of said straight bearing surface of the traction member, said longitudinal opening in the run-way being less in width than said rolling members, whereby the run-way is adapted to retain said members while the latter are presented through said longitudinal opening for contact with the straight bearing surface of the traction member to support the traction member in its travel from wheel to wheel.

30. In a tractor comprising an endless traction chain composed of rigid links pivotally joined, and carrying wheels for said chain, one face of each link being formed for road engagement and the opposite face having a straight bearing surface, one of the carrying wheels comprising two flanges spaced apart, and formed to engage the end portions of the links laterally outside of said straight bearing surfaces thereof; a plurality of rolling members and a run-way for said members extending from wheel to wheel to present the rolling members for contact with the straight bearing surfaces of the links for supporting the latter in their travel from wheel to wheel, said run-way passing between the two flanges of the said carrying wheel in a form to deflect the rolling members out of contact with the traction chain links while the latter are supported on said wheel.

31. In a tractor comprising an endless traction chain composed of rigid links pivotally joined and two sprocket wheels adapted to carry said chain by engagement with the links at their pivotal connection, one face of each link being formed for road engagement and the opposite face having a straight bearing surface; a plurality of rolling members and a run-way for said members comprising straight sections extending opposite the upper and lower plies of the chain for presenting said rolling members thereto from wheel to wheel, and a curved portion connecting the adjacent ends of said straight portions.

32. In a tractor comprising an endless flexible traction member, and wheels on which it is carried, one face of the traction member being formed for road engagement and the opposite face having a straight bearing surface, a plurality of rolling members and a run-way for said members, having a portion extending under the upper ply of said traction member for supporting the latter from wheel to wheel, said portion opening upwardly to expose the rolling members for contact with the bearing surface of the traction member, and having apertures in its side walls to permit ejection of foreign matter dropping from the traction member onto the rolling bearing members in the run-way.

33. In a tractor comprising two carrying wheels and a flexible endless traction element thereon, a frame in which said wheels are journaled, a motor, and a motor-carrying frame, said frames being pivotally connected at the axis of one of the wheels, and yielding means connecting the two frames at a point remote from their pivotal connection.

34. In a tractor, a flexible endless traction element, a frame provided with guide and supporting means for the traction element, a driving wheel for said traction element, a motor, and a motor carrying frame, said frames being pivotally connected at the axis of the driving wheel and yieldingly connected at a point remote from said axis.

35. In a tractor comprising a motor, a carrying frame therefor, a pair of wheels co-axially journaled upon said frame, two auxiliary frames pivotally connected to the motor-carrying frame at the axis of said wheels; a second pair of wheels journaled respectively on said frame; a pair of endless traction belts each encompassing one of each pair of wheels, and vertically yielding connections between said auxiliary frames and the motor frame at points remote from their pivotal connection.

36. In a tractor comprising a motor, a carrying frame therefor, a pair of wheels co-axially journaled upon said frame, two auxiliary frames pivotally connected to the motor-carrying frame at the axis of said wheels; a second pair of wheels journaled respectively on said frames; a pair of endless traction belts, each encompassing one of each pair of wheels and separate vertically yielding connections between said auxiliary frames respectively and the motor frame at points remote from their pivotal connection.

37. In a tractor comprising a motor, a carrying frame therefor, a pair of driving wheels coaxially journaled upon said frame, transmission mechanism connecting said wheels with the motor; two auxiliary frames pivotally connected to the motor-carrying frame at the axis of said driving wheels, a pair of idler wheels journaled respectively on said frames, a pair of endless traction belts, each encompassing one of each pair of wheels, and vertically yielding connections between said auxiliary frames and the motor frame at points remote from their pivotal connection.

38. In a tractor comprising two carrying wheels and a flexible endless traction element thereon, a frame in which said wheels are journaled for rotation about parallel axes, and having supporting means extending opposite the road-engaging ply of the traction element for sustaining the latter from wheel to wheel, a motor, and a motor-carrying frame, said frames being pivotally connected at the axis of one of the wheels, and yielding means connecting the two frames at a point remote from their pivotal connection.

39. In a tractor comprising two carrying wheels and a flexible endless traction element thereon, a frame in which said wheels are journaled for rotation about parallel axes, and having run-ways opposite both the upper and lower plies of the traction element for supporting the latter from wheel to wheel; a motor, and a motor-carrying frame, said frames being pivotally connected at the axis of one of the wheels; and vertically yielding cushions extending toward each other from both run-ways with a part of the motor frame engaged between said cushions.

40. In a tractor comprising two carrying wheels and a flexible endless traction element thereon; a frame in which said wheels are journaled, a motor and a motor-carrying frame, said frames being pivotally connected at the axis of one of the wheels, and coöperating guiding means connecting parts of the two frames remote from their pivotal axis and formed to confine relative movement of said frames to rotation about such axis.

41. In a tractor comprising two carrying wheels and a flexible endless traction element thereon; a frame in which said wheels are journaled, a motor and a motor-carrying frame, said frames being pivotally connected at the axis of one of the wheels, and coöperating guiding means connecting parts of the two frames remote from their pivotal axis and formed to confine relative movement of said frames to rotation about such axis, together with cushioning means positioned to react between relatively movable parts of the two frames.

42. In a tractor comprising a motor, a carrying frame therefor, a pair of wheels co-axially journaled upon said frame; two auxiliary frames pivotally connected to the motor-carrying frame at the axis of said wheels; a second pair of wheels journaled respectively on said frames; a pair of endless traction belts each encompassing one of each pair of wheels; substantially vertical guide-ways on said auxiliary frames remote from their pivotal connection with the motor frame; a cross member of the motor frame having its opposite ends engaged in such guide-ways, said engaged parts being formed to prevent relative lateral movement of the frames and vertically yielding cushion devices positioned to react between the motor frame and the auxiliary frames respectively.

43. In a tractor comprising a motor, a carrying frame therefor, a pair of wheels co-axially journaled upon said frame, two auxiliary frames pivotally connected to the motor-carrying frame at the axis of said wheels, a second pair of wheels journaled respectively on said frames, a pair of endless traction belts each encompassing one of each pair of wheels, said auxiliary frames each having a run-way extending opposite the road-engaging ply of the traction belt for supporting the latter from wheel to wheel, and yielding connections between said auxiliary frames and the motor frame arranged to react against said runways.

44. In a tractor comprising a motor, a carrying frame therefor, a pair of wheels journaled upon said frame, two auxiliary frames pivotally connected to the motor-carrying frame at the axis of said wheels; a second pair of wheels journaled respectively on said frames; a pair of endless traction belts each encompassing one of each pair of wheels, said auxiliary frames each having run-ways opposite both the upper and lower plies of the traction belt for supporting the latter from wheel to wheel; yielding cushion devices extending toward each other from two run-ways of each auxiliary frame, and a cross member of the motor frame having its opposite ends engaged between such cushion devices of the respective frames.

45. In a tractor comprising a motor, a carrying frame therefor, a pair of wheels co-axially journaled upon said frame; two auxiliary frames pivotally connected to the motor-carrying frame at the axis of said wheels; a second pair of wheels journaled respectively on said frames; a cross member on the motor frame having horizontally-expanded end portions; a vertically extending guide-way on each of the auxiliary frames comprising a chamber having vertical slots opening toward the motor frame to receive the cross member with its expanded end in the chamber, whereby said auxiliary frames are stopped against lateral movement with respect to the motor frame and vertically yielding cushion members in each chamber engaging the upper and under sides of the said expanded ends of the cross member.

In testimony whereof I have hereunto set my hand at Chicago, Illinois, this 28th day of August, 1915.

WILLIAM P. ALLEN.